United States Patent [19]

Johnson et al.

[11] 4,357,083
[45] Nov. 2, 1982

[54] METHOD AND APPARATUS USING WEIGHTED RANGE SIGNAL FOR CONTROLLING PHOTOGRAPHIC FUNCTIONS

[75] Inventors: Bruce K. Johnson, Andover; George D. Whiteside, Lexington, both of Mass.

[73] Assignee: Polaroid Corporation, Cambridge, Mass.

[21] Appl. No.: 193,891

[22] Filed: Oct. 6, 1980

[51] Int. Cl.³ ............... G03B 7/087; G03B 13/20; G03B 7/18

[52] U.S. Cl. .................... 354/22; 354/25; 354/23 R; 354/27; 354/33; 356/225

[58] Field of Search ............ 354/22, 23 R, 25, 27, 354/29, 30, 33–35, 59, 60 F, 67, 127, 128, 163, 195, 298; 356/225

[56] References Cited

U.S. PATENT DOCUMENTS

| | | | |
|---|---|---|---|
| Re. 27,461 | 8/1972 | Harvey | 95/44 C |
| 1,866,581 | 7/1932 | Simjian | |
| 3,173,347 | 3/1965 | Stimson et al. | 95/10 |
| 3,418,904 | 12/1968 | Wick et al. | 95/10 |
| 3,465,656 | 9/1969 | Wick et al. | 95/10 |
| 3,478,660 | 11/1969 | Land | 95/11.5 |
| 3,543,662 | 12/1970 | Erlichman | 95/11 |
| 3,547,017 | 12/1970 | Harvey | 95/10 |
| 3,547,017 | 12/1970 | Harvey | 95/10 |
| 3,583,299 | 6/1971 | Land | 95/10 |
| 3,672,281 | 6/1972 | Land | 95/42 |
| 3,705,542 | 12/1972 | Gold | 95/19 |
| 3,709,123 | 1/1973 | Tokutomi | |
| 3,714,871 | 2/1973 | Bresson | |
| 3,716,752 | 2/1973 | Iwata | 315/151 |
| 3,723,003 | 3/1973 | Vockenhuber et al. | 356/4 |
| 3,736,057 | 5/1973 | Harvey | 356/4 |
| 3,748,984 | 7/1973 | Gold | 95/19 |
| 3,779,770 | 12/1973 | Alston et al. | 96/76 C |
| 3,813,679 | 5/1974 | Hasegawa et al. | 95/44 R |
| 3,823,410 | 7/1974 | Tokutomi et al. | 354/33 |
| 3,836,924 | 9/1974 | Kawasaki | 354/33 |
| 3,842,428 | 10/1974 | Kawasaki | 354/145 |
| 3,868,701 | 2/1975 | Kawasaki | 354/33 |
| 3,917,395 | 11/1975 | Ogawa | 354/23 D |
| 3,937,574 | 2/1976 | Peckham et al. | 356/4 |
| 3,937,575 | 2/1976 | Bateman | 356/5 |
| 3,945,023 | 3/1976 | Stauffer | 354/25 |
| 3,977,014 | 8/1976 | Norris | 354/196 |
| 3,988,747 | 10/1976 | Lermann et al. | 354/25 |
| 4,032,934 | 6/1977 | Hendrickson et al. | 354/25 |
| 4,040,072 | 8/1977 | Johnson et al. | 354/173 |
| 4,047,022 | 9/1977 | Holle | 250/201 |
| 4,065,778 | 12/1977 | Harvey | 354/25 |
| 4,123,650 | 10/1978 | Hosoe et al. | 250/201 |
| 4,127,325 | 11/1978 | Ohtaki et al. | 354/32 |
| 4,148,574 | 4/1979 | Johnson | 354/195 |
| 4,150,888 | 4/1979 | Filipovich | 354/25 |
| 4,155,029 | 5/1979 | Yamaoka | 315/151 |
| 4,159,870 | 7/1979 | Corey et al. | 354/32 |
| 4,159,873 | 7/1979 | Farnsworth | 356/5 |
| 4,160,159 | 7/1979 | Kakukawa et al. | 250/204 |
| 4,167,316 | 9/1979 | Johnson et al. | 354/197 |
| 4,188,103 | 2/1980 | Biber et al. | 354/27 |
| 4,192,587 | 3/1980 | La Rocque et al. | 354/27 |
| 4,199,246 | 4/1980 | Muggli | 354/195 |
| 4,221,474 | 9/1980 | Lermann et al. | 354/23 D |
| 4,230,400 | 10/1980 | Wick et al. | 354/25 |
| 4,256,995 | 3/1981 | Ishida | 354/33 X |
| 4,302,084 | 11/1981 | Greenwald et al. | 354/25 |
| 4,304,476 | 12/1981 | Bloom | 354/49 |

OTHER PUBLICATIONS

Canon AF35m Toward Utimate Automation; L. Andrew Mannheim, J. of British Photography, Nov. 2, 1979, pp. 1050, 1051.
U.S. Patent Application Ser. No. 110,811.
U.S. Patent Application Ser. No. 127,120.
U.S. Patent Application Ser. No. 156,198.

Primary Examiner—G. Z. Rubinson
Assistant Examiner—S. D. Schreyer
Attorney, Agent, or Firm—Leslie J. Payne

[57] ABSTRACT

Method and apparatus are disclosed which direct a preliminary pulse of radiation from a selectively energizable light source toward a subject, and a device for evaluating the amplitude of the reflected pulse of radiation therefrom so as to determine a weighted range signal as a function of the amplitude of generally non-visible radiation frequencies selected for reducing the non-uniformity in reflectivity values of reflected visible radiation in the scene, which weighted range signal includes a reflectivity factor and a range factor. The reflectivity factor, which detracts from the range factor for focusing, significantly enhances exposure control under certain scene lighting conditions.

29 Claims, 6 Drawing Figures

METHOD AND APPARATUS USING WEIGHTED RANGE SIGNAL FOR CONTROLLING PHOTOGRAPHIC FUNCTIONS

BACKGROUND OF THE INVENTION

The present invention pertains to ranging systems for controlling various functions in a photographic apparatus. More specifically, it relates to a method and apparatus for controlling photographic focusing, exposure and flash firing functions according to camera-to-subject range.

In the photographic arts, various systems have been proposed for transmitting energy to an object and detecting the reflected energy. Characteristics of the transmitted and reflected energy are utilized for deriving a signal representative of the object-to-system distance. This signal is used for controlling a variety of photographic operations including focusing, flash firing and exposure.

One example of such a ranging system is described in U.S. Pat. No. 4,199,246 entitled "Ultrasonic Ranging System For a Camera", issued to J. Muggli, on Apr. 22, 1980. For determining object distance, the elapsed time between transmission and receipt of an ultrasonic signal, which is bounced off the object, is utilized. The ultrasonically derived ranging signal is used for driving a lens assembly to a correct focal position for focusing purposes.

Another known ranging system for cameras uses the concept of triangulation as a means for deriving subject range. An example of this is employed in Canon's AF 35M camera, wherein an infrared-emitting diode shifts laterally, during a measuring cycle, relative to a fixed sensor cell which monitors the maximization of the reflected infrared radiation. The distance the emitter diode travels to provide such maximization is related to the subject distance and a range signal is derived for adjusting focusing of a lens arrangement. U. S. Pat. Nos. 3,736,057 and 4,150,888 are also exemplary of cameras employing triangular type range systems.

The foregoing ranging techniques are also utilized for flash control as, for example, with use of a "follow-focus" mechanism. Mechanisms of this kind utilize a derived range signal or the resultant lens position for locating a preselected aperture value, in operative relation to the exposure path, for providing proper exposure during flash firing. Thus, a scanning shutter blade mechanism may be stopped at an aperture value corresponding to the camera-to-subject distance. Reference is made to U.S. Pat. No. 3,977,014 entitled "Follow Focus Exposure Control System With Improved Uniform Trim Control", by P. Norris, issued Aug. 24, 1976, in common assignment herewith for an example of such a follow-focus mechanism.

In other scanning shutter systems, the opening shutter blade movement is not stopped at the selected exposure aperture. Instead, the time of flash firing is varied in response to subject range so as to dynamically select an appropriate aperture, which for a given strobe output, will produce adequate lighting of the subject at that measured range. Significantly, the duration of the strobe light in such system is short in comparison to shutter blade scan time. Hence, the aperture defined by the shutter blades at the instant of strobe firing, for practical purposes, constitutes the effective aperture at which the flash exposure occurs. Such systems are more fully described in U.S. Pat. No. 3,478,660 entitled "Photographic Apparatus With Flash Exposure Control System", by E. Land, issued Nov. 18, 1969, and U.S. Pat. No. 4,188,103 entitled "Range Synchronized Flash Photographic Apparatus and Method For Achieving Optimum Exposure", issued Feb. 12, 1980; all commonly assigned herewith.

The above described range dependent flash control systems, while highly successful, generally utilize relatively costly ranging units and fail to account for the variations in light reflectivity typically found in photographic scenes.

On the other hand, many flash control systems, such as for example photoresponsive quench control strobe systems, are heavily dependent upon scene reflectivity. Likewise wink type systems, such as described in U.S. Pat. Nos. 3,465,656, 3,418,904 and 3,583,299, which employ a preliminary flash or wink for flash control, are also sensitive to scene reflectivity. Unfortunately, the wide range of reflectivity encountered in some photographic scenes results in poor regulation in such instances.

Advantageously, it has been found that the use of non-visible light, i.e., infrared, for evaluation during flash exposure reduces the extreme variation of reflectivity as described in U.S. Applications, Ser. No. 127,120 filed Mar. 4, 1980 abandoned and Ser. No. 156,198 filed Dec. 31, 1979 U.S. Pat. No. 4,315,075 and commonly assigned herewith.

In photographic ranging, infrared illumination has been conventionally utilized to avoid disturbance of the scene. In time based range systems and triangulation range systems, which are not dependent upon the total amount of reflected energy, the use of such non-visible light has no basic effect on the measured range. Likewise, the infrared illumination employed in U.S. Pat. No. 3,937,574 is of no effect with regard to ranging since this arrangement employs a novel, dual detector system to eliminate all reflectivity values from the resulting range signal.

Finally, U.S. Pat. No. 3,173,347 teaches the use of an infrared light source for ranging in an intensity evaluating system to the advantage as stated therein that the camera exposure control need not be disabled for flash, the system is useful at low ambient levels, and the subject is not aware of such illumination. The latter system utilizes a special source of infrared illumination with a special photocell to provide a range signal responsive to the intensity of reflected radiation from the subject. Hence, this patent employs infrared illumination for conventional reasons, fails to recognize any improvement in reflection variation, and employs a complicated dual system to achieve its range signal.

SUMMARY OF THE INVENTION

According to the present invention, there is provided an improved method and apparatus for controlling photographic functions as a function of the evaluated intensity resulting from the reflection of a pulse of artificial illumination. The camera apparatus comprises a lens assembly for directing image-carrying light rays along a given path from a photographic scene to a focal plane. A shutter system for controlling the transmission of light from the scene to the focal plane so as to define an exposure interval during an evaluation period. Means are provided for first actuating a light source, configured to produce both visible and non-visible electromagnetic frequencies to direct a first pulse of radiation of given intensity toward a subject in the scene prior to commencement of or in the early stages of the exposure interval to evaluate the subject including its distance from the camera, and for subsequently actuating the same source to direct a second pulse of radiation toward the subject during said exposure interval to artificially illuminate the subject for photographic recording during exposure. In an illustrated embodiment, means for evaluating the intensity of light reflected from the scene during the first pulse of illumination are provided wherein the evaluating means includes means for reducing the contribution to said evaluation of the visible frequencies relative to that of the non-visible frequencies reflected from said scene responsive to the first pulse. Also provided are means being responsive from reflection of the first pulse for controlling at least one photographic function, whereby non-visible frequencies from the source are utilized for subject evaluation and subsequent photographic control, and the visible frequencies from the same source are utilized for scene illumination for photographic recording during the exposure interval.

Advantageously, the means for evaluating the reflected intensity from the first pulse comprises means for the evaluation of essentially infrared frequencies. The use of infrared reduces the reflectivity variations, such that the reflected intensity provides a weighted range signal which controls both focusing and flash exposure. Significantly, while the weight range signal includes a reflectivity factor which obscures the exact range, this type of range error is sufficiently small with infrared evaluation that the weighted range signal can be employed successfully for focusing while on the other hand, the same reflectivity factor can enhance flash exposure control in comparison to flash exposure derived from a pure range signal in certain situations.

While the present invention prefers only evaluation of the reflected infrared frequencies and contemplates substantial exclusion of visible frequencies, it should be realized that any reduction in visible light reception versus infrared reception of the reflected wink light will provide an improvement in the range information from such a wink system.

In another illustrated embodiment, there is provided photographic apparatus having means for directing image forming light rays from a subject along an exposure path to a focal plane. Image recordable means are positioned in the exposure path for recording the image forming light rays at the focal point. Selectively operable means are provided for being displaced in response to a weighted ranging signal so as to focus the rays at the focal plane. For controlling the amount of scene radiation to the image recordable means, there is provided selectively operable means for unblocking and blocking the exposure path and for defining a predetermined timewise variation of exposure aperture area relative to the exposure path during the exposure portion. Selectively energizable means are provided for producing a pre-exposure pulse of frequencies including visible and non-visible frequencies. For determining a weighted subject range signal, there is provided an evaluating means. This evaluating means evaluates the amplitude of the generally non-visible frequencies, such as infrared, of the reflected pulse for determining a weighted subject range signal as a function of the amplitude of this generally non-visible frequency. Infrared frequencies are selected to reduce the wide variations of reflectivity values of reflected visible radiation is that while the weighted signal includes both a range factor and a reflectivity factor the extreme variations of the latter are eliminated. Responsive to the weighted range signal are means for actuating the energizable means to produce a main pulse of illumination having visible and non-visible frequencies during the exposure portion, after a time period which is in accordance with the weighted range signal and synchronized with the timewise variation in an aperture area of the unblocking means to obtain a proper exposure of the subject in accordance with both the subject range and the infrared reflectivity. Also provided are means responsive to the weighted range signal for automatically focusing the image forming light rays at the focal plane as a function of the subject range. The evaluating means also evaluates scene radiation during the unblocking portion for controlling the unblocking means so as to terminate the exposure portion for defining an exposure interval.

Among the objects of the invention are, therefore, the provision of a method of and apparatus for providing an improved photographic exposure control process; the provision of a method of and apparatus for providing improved flash photography; the provision of a method of and apparatus for providing improved focusing and exposure; the provision of a method of and apparatus for determining a weighted subject-to-apparatus range by measuring the amplitude of non-visible radiation frequencies produced by an energizable radiation source; the provision of a method of and apparatus for determining weighted subject range by measuring the amplitude of non-visible radiation frequencies reflected from the subject object in a scene to be photographed which non-visible radiation frequencies are selected to reduce the non-uniformity of the reflectivity of reflected scene radiation; and the provision of a method of and apparatus for using a signal indicative of subject range as derived above for automatically focusing an objective lens as a function of such signal.

Other objects and further scope of applicability of the present invention will become apparent from the detailed description to follow when taken in conjunction with the accompanying drawings in which like parts are designated by like reference numerals.

BRIEF DESCRIPTION OF THE DRAWINGS

FIG. 2A is an exploded perspective view of a photocell lens assembly usable in the present invention;

DETAILED DESCRIPTION

Figure 1:
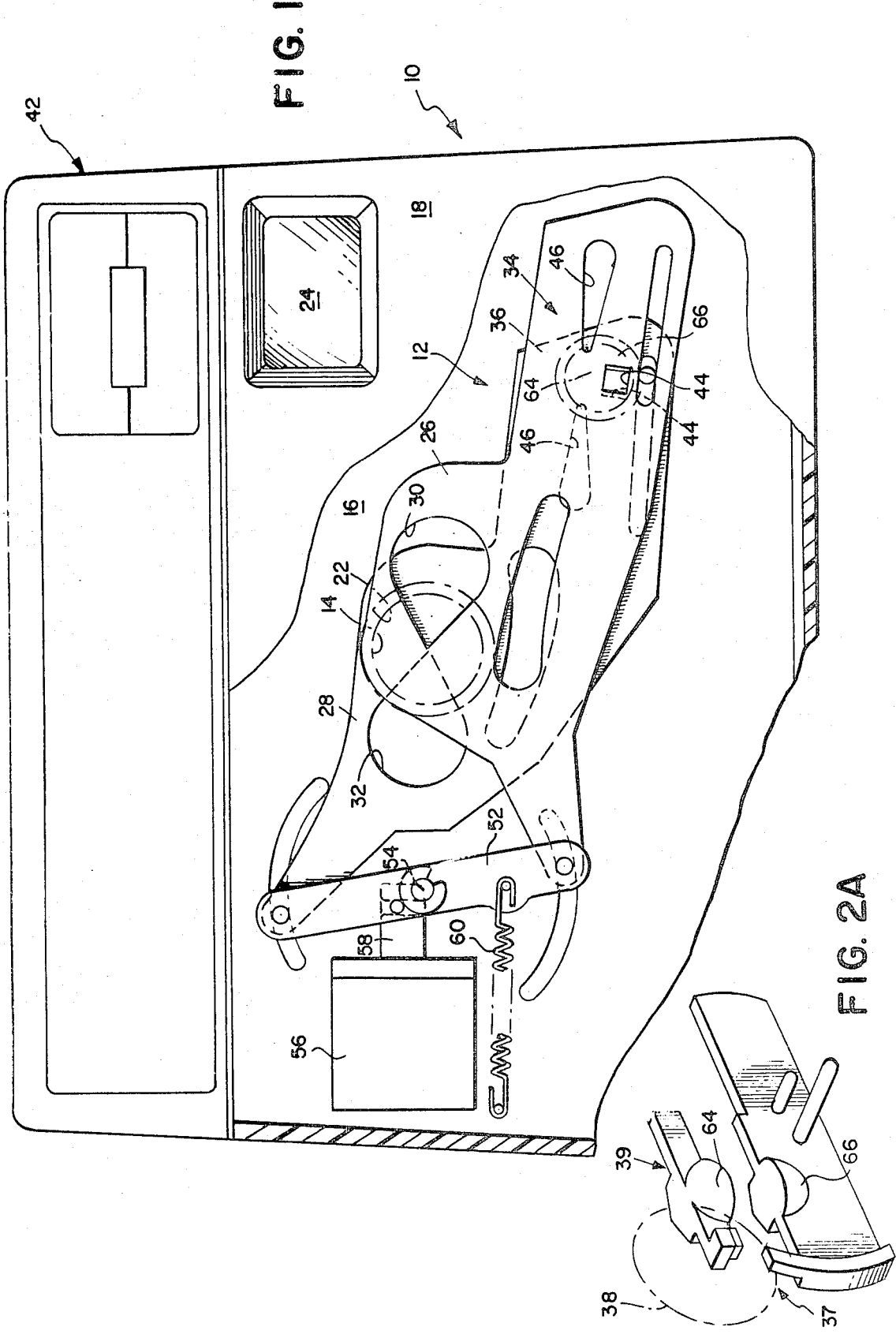
FIG. 1 is an elevational view illustrating an embodiment of a photographic apparatus employing aspects of the improved flash fire and focusing system of this invention.

FIG. 1 illustrates a photographic camera apparatus 10 of the self-developing kind. This camera has a new and improved focusing and exposure control system designated generally by reference numeral 12. A light exposure opening 14 is formed centrally in a base block casting 16. The casting 16 is stationarily affixed in and to a camera housing 18. The light exposure opening 14 is constructed for defining the maximum available exposure aperture of the system 12 as well as for allowing scene light to reach an image recordable photographic film unit 20 (FIG. 2) of a film pack (not shown). Examples of film packs containing multiple film units of the self-developing type usable in the camera 10 are described in U.S. Pat. Nos. 3,543,662; 3,705,542; 3,748,984 and 3,779,770. These film packs are of the kind manufactured and sold by the Polaroid Corporation, Cambridge, Massachusetts. Each of the film units 20 of the film pack is successively positioned at the focal plane P of the camera 10.

Connected to and supported by a front wall of the camera housing 18 in overlying relationship to the light exposure opening 14 is a movable objective lens assembly or arrangement 22. The lens arrangement 22 is of the variable focal type and permits the image carrying rays to pass therethrough. These rays are then reflected from a mirror (not shown) housed in the camera housing 18 to the uppermost one of the film units 20 in the film pack. For convenience the lens arrangement 22 is artificially depicted as a single lens element movable along an axis for focusing purposes. For instance, the variable focus lens arrangement 22 could be of the lens disk type, such as disclosed in U.S. Pat. No. 4,167,316, issued Sept. 11, 1979, and in common assignment herewith. However, in this embodiment, the movable lens arrangement 22 can be of the dual zone type and is in overlapping optically aligned arrangement with the aperture opening 14. The lens arrangement 22 will be automatically positioned in either a near focus zone or a far focus zone in response to a signal generated by a ranging circuit which signal is, in part, in accordance with the distance of the subject or object 17 to be photographed. Since the movable lens arrangement 22 is of a known type and does not, per se, form an aspect of this invention, reference is made to U.S. Pat. No. 4,148,574, issued to Bruce K. Johnson on Apr. 10, 1979 and commonly assigned herewith for a more complete description of its construction and mode of operation. Also, this invention envisions that a fixed focus lens could be used. In the latter case, of course, there would not be need of an automatic ranging function.

Connected to the front face of the camera housing 18 is a viewing window 24 which operates in conjunction with the camera viewing system (not shown) for permitting viewing and framing of the object 17 to be photographed.

Figure 2:
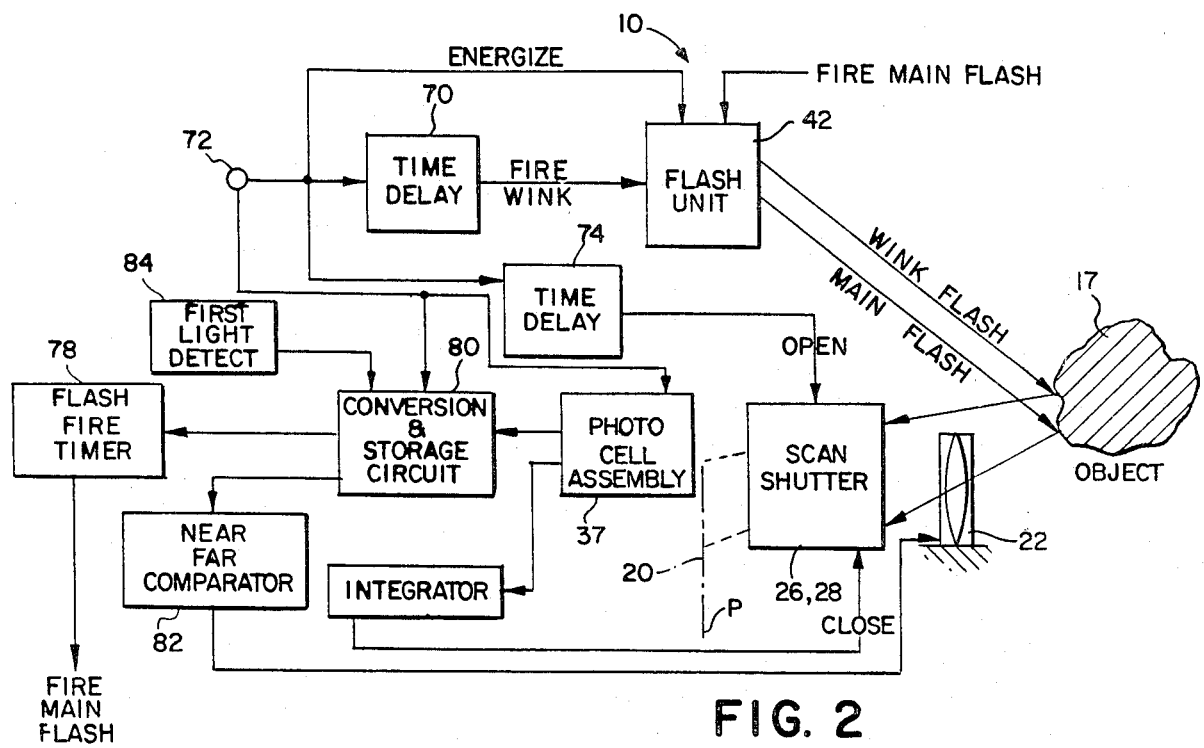
FIG. 2 is a block diagram showing the photographic apparatus employing this invention.
Figures 3, 5:
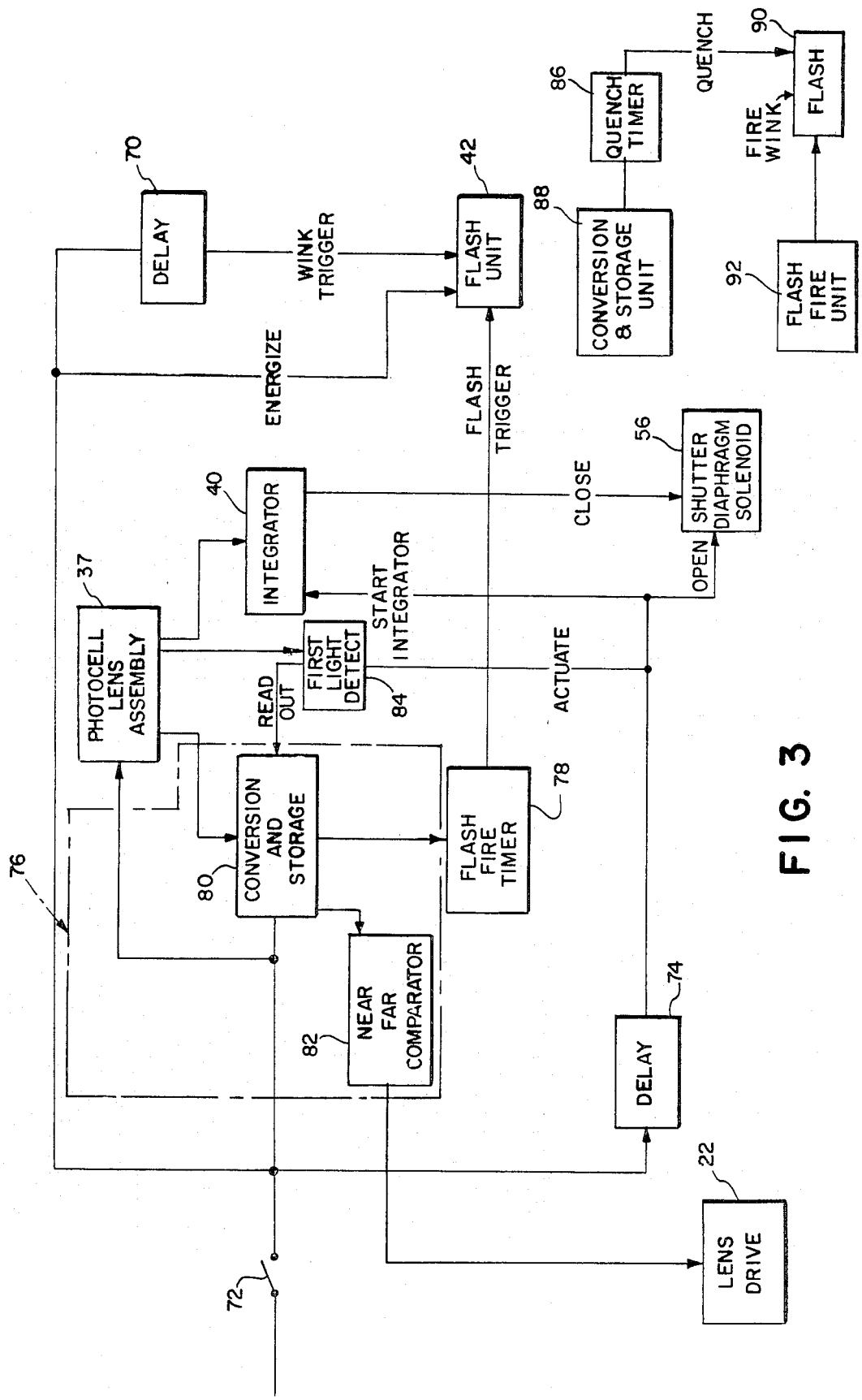
FIG. 3 is a block diagram of the circuitry of the photographic apparatus including the flash fire and focusing system of this invention.
FIG. 5 is a block diagram of circuitry of an alternate preferred embodiment.

Continued reference is made to FIG. 1 along with FIGS. 2-3 for better depicting the construction and operation of the focusing and exposure control system 12. Included in this system 12 is a blade mechanism comprising a pair of scanning shutter type blades 26 and 28. Since the blade mechanism does not, per se, form an aspect of the present invention, only a description of its construction and operation necessary for a complete understanding of the present invention will be given. Reference is, however, made to commonly assigned U.S. Pat. No. 4,040,072 for a more complete description of such a blade mechanism. The shutter blades 26, 28 are supported for scanning type reciprocatory movement on and by the base block casting 16 so as to be positioned intermediate the lens arrangement 22 and the light exposure opening 14.

Formed in the scanning shutter blades 26, 28 is a pair of taking or scene light admitting primary apertures 30, 32; respectively. During blade scanning movement, the taking apertures 30, 32 coincide in overlapping relationship with respect to both the light exposure opening 14 and the lens arrangement 22 to define progressively increasing taking aperture areas as a function of blade positioning. In this embodiment, the taking apertures 30, 32 define a time-variable exposure aperture area. As will be described more fully hereinafter, during exposure, the flash arrangement will fire an artificial flash or pulse of illumination at the end of a time interval dependent on both the range and reflectivity of the object 17 as well as the shutter scan rate such that whenever the object 17 is within a predetermined maximum flash range from the camera, the instantaneous product of object brightness due to flash illumination and aperture area will essentially be constant, resulting in proper flash exposure of the film unit 20 independently of variation in the subject range or reflectivity. For greater details regarding the construction of various scanning shutter programs for the taking apertures 30, 32, reference is made to the noted U.S. Pat. No. 4,188,103.

Also formed in the shutter blades 26, 28 is a set of corresponding pairs of secondary or photocell sweep apertures indicated generally by reference numeral 34. The corresponding and overlapping set of photocell apertures 34 define a plurality of small, effective photocell aperture areas for controlling the passage of scene radiation to a light detecting station shown generally at 36. The light detecting station 36 includes a photocell 37 of the silicon photodiode type having a photocell detector 38 (FIG. 2A) and a lens assembly 39. The photodetector 38 cooperates with a light integrating circuit shown generally at 40 (FIG. 3), in a well-known manner for energizing a solenoid 56 for terminating the exposure interval of the shutter blades 26, 28, as a function of the time integration of scene radiation intensity incident on the photodetector 38. The amount and character of scene radiation incident on the photodetector 38 is controlled by photocell sweep apertures 34 and the photocell lens assembly 39. As will also be described more fully, scene radiation detected by the photocell detector 38 is also used to derive a weighted object-to-camera range signal. Such signal is utilized for both focusing the lens arrangement 22 and for firing the electronic flash or strobe unit 42 after a time interval which is a function of distance.

The term "flash" as used throughout this application is intended to include any transient light pulse. Preferably, this embodiment uses an electronic flash or strobe whose pulse duration is quite short, as compared to the shutter scan time. It is also applicable with longer duration light pulses, such as from incandescent flash units. The term "weighted range signal" as used throughout this application is a signal which includes both a range factor and a factor dependent on reflectivity.

As best viewed in FIG. 1, each of the shutter blades 26, 28 includes wink photocell apertures 44 and ambient photocell apertures 46. Each pair of the photocell apertures 44, 44; and 46, 46 progressively cooperates to form distinct coinciding pairs of photocell effective aperture areas for defining distinct and progressively varying photocell aperture values which change as a function of blade positioning.

Distal ends of the shutter blades 26, 28 are pivotally connected to distal ends of a walking beam 52. In turn, the walking beam 52 is pivotally connected to the base block casting 16 by a pivot pin 54. Distal ends of the walking beam 52 have pin members extending through respective circular openings formed in the respective shutter blades 26, 28. These pin members slidably engage respective arcuate slots formed in the base block casting 16 for prohibiting shutter blade disengagement.

Displacement of the shutter blades 26, 28 is provided, in part, by a tractive electromagnetic device or solenoid 56. Included in the solenoid 56 is an internally arranged and movable cylindrical plunger unit 58. This plunger 58 is affixed to the walking beam 52 by means of a pivot pin or stud. Longitudinal displacement of the plunger 58 is effective for rotating the walking beam 52 about the pivot pin 54. Solenoid energization retracts the plunger unit 58 into the solenoid housing thereby driving the shutter blades 26, 28 to a scene light blocking condition (see FIG. 1). Biasing spring 60 normally serves to force the plunger unit 58 outwardly from the solenoid housing so as to rotate the walking beam 52 counterclockwise. The biasing spring 60 thus continuously urges the taking apertures 30, 32 and the plurality of photocell apertures 44, 46 and to positions defining their effective aperture areas. Towards this end, one end of the biasing spring 60 is affixed to the base block casting 16 while its opposite end is attached to the walking beam 52.

Although this embodiment is described for use with non-reflex type cameras, the intended scope of this invention is, of course, by no means so limited. Thus, cameras of the well-known reflex type, such as described in U.S. Pat. No. 3,672,281, entitled "Reflex Camera", by E. H. Land, commonly assigned herewith may be equally suitable for embodying the exposure control system of this invention.

Power for the camera apparatus 10 comes from a battery (not shown) housed in the film pack. For conserving battery power, the solenoid 56 should not be continuously energized for maintaining the shutter blades 26, 28 in their scene light blocking position. Towards this end, a latch mechanism (not shown) is provided. This mechanism automatically latches the walking beam 52 in the scene light blocking condition after each exposure. Hence, the solenoid 56 can be deenergized when the blades 26, 28 are at rest. Therefore, the battery is not drained during camera non-use. Unlatching of this latch mechanism commences upon commencement of exposure. The solenoid is initially energized to retract the plunger 58 and cause unlatching. Later, the solenoid is deenergized to free the spring 60 to drive the shutter blades 26, 28 toward their maximum scene light admitting condition. Details regarding the latching mechanism as well as its mode of operation do not, per se, form an aspect of this invention. Therefore, reference is made to U.S. Pat. No. 4,040,072, assigned in common herewith, for a more complete description thereof.

Referring back to the photocell lens assembly 39, it directs the scene light onto the photodetector 38 as well as spectrally filters various frequencies of the broad band of spectral frequencies emitted by the electronic strobe unit 42. The integrating circuit 40 integrates the amount of scene light intensity incident upon the photocell detector as a function of time. This occurs, of course, as long as the various noted cooperating pairs of photocell apertures 46 are effective for controlling and directing scene radiation to the photocell lens assembly 39 and the photodetector 38.

The lens assembly 39 includes upper and lower optical lens elements 64 and 66; respectively. The upper lens element 64 transmits spectral frequencies in the visible range (e.g., 400-700 nm) while blocking frequencies in the near infrared range or region (e.g., 700-1200 nm). Conversely, the lower lens element 66 transmits exclusively infrared frequencies, but blocks the visible spectrum frequencies. Each of the optical lens elements 64, 66 is, preferably, molded as a single plastic piece from materials having suitable optical properties for achieving such filtering.

Figure 4:
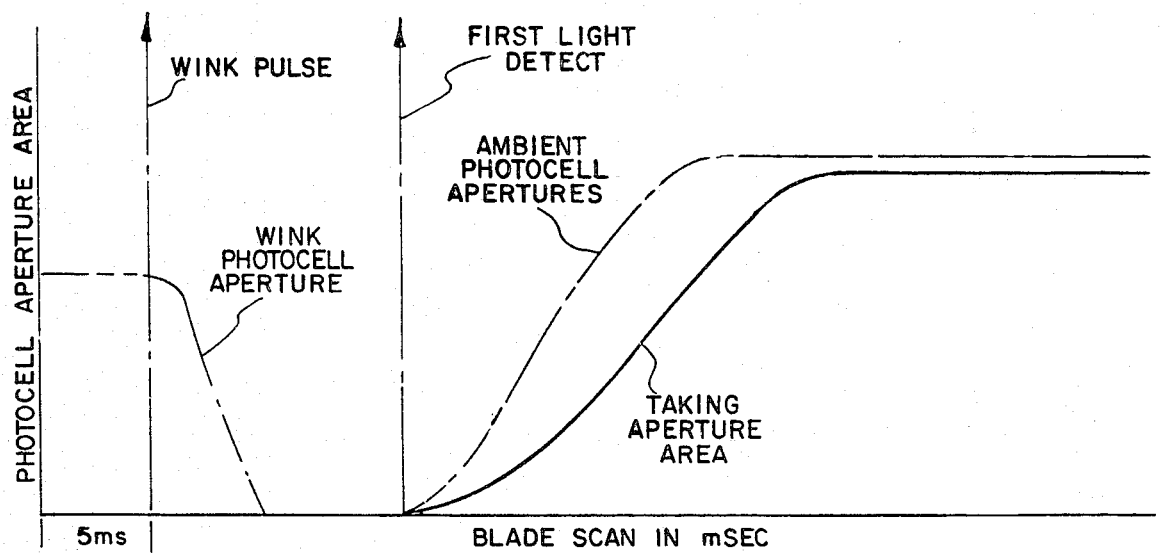
FIG. 4 is a time diagram showing the variation of the exposure and photocell aperture areas of the blade mechanism during blade scan.

The lower lens element 66 is employed in conjunction with the wink photocell apertures 44 during the preliminary flash so as to only evaluate infrared reflection at that time. During an exposure, the upper optical lens element 64, which blocks the infrared frequencies, is used. This is best depicted in FIG. 4 wherein the ambient photocell aperture curve is shown which is defined by the ambient apertures 46 which control scene light to the upper optical element. The cooperation of the ambient photocell apertures during shutter blade scan is disclosed in commonly assigned U.S. Pat. No. 4,192,587.

While this embodiment uses upper and lower optical elements for spectral filtering, such filtering can be accomplished by virtue of the pairs of photocell apertures 44 and 46 having appropriate spectral filter material associated therewith. This effects substantially the same type of spectral filtering as mentioned above. The association of spectral filters, photocell apertures on shutter blades for exposure control purposes is described in commonly assigned and copending U.S. application Ser. No. 110,811, entitled "Apparatus For Varying The Spectral Filter Over The Photocell As A Function of Blade Position", filed on Jan. 10, 1980, by Milton S. Dietz U.S. Pat. No. 4,325,616.

The present invention takes advantage of the relatively uniform reflectivity values of the infrared frequencies (as compared to visible frequencies) for deriving a weighted range signal from a preliminary flash for both controlling focusing and for exposure. Because only the relative uniform reflectivity values of the infrared frequencies are used for deriving the weighted range signal, such signal will be more representative of the subject range while retaining a reflectivity factor effective for controlling flash exposure. This is because the influence of the relatively widely disparate reflectivity values of the object in the visible region are reduced. Hence, the derived range signal will be less subject to the particular reflectivity and absorption characteristics of the object 17 and background. However, the reduced reflectivity values are still advantageous for enhancing flash exposures as compared to systems employing a pure range signal which cause exposure errors for scenes of extreme reflectivity.

The use of infrared frequencies for ranging purposes is accomplished in a manner to be described. Essentially, the strobe unit 42 is operated to provide two pulses of illumination for each exposure cycle. First, there is a preliminary or wink pulse of relatively low intensity which is fired before exposure or first light detect (FIG. 4). Then, there is a main pulse of relatively high intensity fired during actual exposure. Both pulses of artificial illumination are directed at the desired object 17 in the scene to be photographed. Each pulse comprises the same broad band of electromagnetic frequencies including both visible and non-visible, infrared (IR), frequencies. For providing these sequential pulses, the strobe unit 42 can include a pair of capacitors (not shown) having the required capacitance respectively to produce a small wink pulse and a large main pulse discharged in sequence. Instead of two capacitors, a single capacitor with thyristor control can be used.

As mentioned, it is desirable to utilize the relatively uniform reflectivity properties of infrared frequencies. This invention contemplates that frequencies in the visible spectrum in or adjacent the infrared range could be used provided they significantly reduce the average-to-high reflectivity values in the visible range. For example, the red end of the visible spectrum might be used. Towards this end the infrared frequencies are evaluated by the photodetector 38 despite the strobe unit 42 producing the noted broad band of frequencies. This is accomplished by the lower optical element 66 functioning to spectrally filter or block-out the visible frequencies. In this regard, prior to first light, the photocell wink apertures 44 are in coincidence over the lower lens element 66 so as to direct scene radiation entering the photocell window (not shown) in the camera housing 18 to the photodetector 38 through this lower lens element 66.

In the illustrated embodiment, the wink apertures 44 are in coincidence prior to camera operation with the photodetector held inoperative. Upon camera actuation, the photodetector is energized. The wink apertures, for example, reach essentially full coincidence (at their maximum aperture value) at approximately 5 milliseconds after blade scan (see FIG. 4). Thus, the coinciding wink photocell apertures 44 move into substantial coincidence over the lens element 66 as the shutter blades 26, 28 start moving toward their first light condition just after being released by the latch mechanism as illustrated by the wink photocell aperture curve in FIG. 4. In synchronization with such full coincidence, firing of the wink pulse by the strobe unit 42 occurs due to actuation by the time delay circuit 70 (FIGS. 2 and 3). Thus, energizing of the strobe unit 42 preferably should take place before the blades 26, 28 are released for scanning movement.

As the scanning blades continue their opening movement, the wink apertures 44 close such that the duration the wink apertures 44 are open is relatively short. This shortness reduces the degree to which background infrared radiation will affect the photodetector 38 during this ranging mode. The present invention also contemplates a device (not shown) that would perform a preliminary scene measuring step prior to the wink pulse to measure the scene IR, and then store and compare such value to the total IR during the wink pulse for determining the IR exclusively attributable to the wink of the flash unit 42.

In operation of the camera 10, the input signal for triggering the time delay circuit 70 for the above purposes is provided by a manually operated input switch 72 which electrically interconnects the battery power source (not shown) to the time delay circuit 70 and in an energizing manner to other camera components such as the photocell lens assembly 37 and the flash unit 42. Besides triggering the time delay circuit 70, the manual input switch 72 also electrically couples the battery to a second time delay circuit 74 which is of sufficient delay to commence the unlatching of the shutter blades 26, 28 after sufficient time to allow the flash unit 42 to be energized. Unlatching frees the walking beam 52 to be driven under the influence of the spring 60 so that the taking apertures 30, 32 travel toward a maximum scene light admitting condition until exposure is terminated. The input switch 72 also actuates the ranging circuit generally enclosed by dotted lines and indicated by reference numeral 76 (FIG. 3) while the time delay 74 further activates the first light detect 84.

As noted earlier, the photodetector 38 will only sense the infrared frequencies of the wink pulse because the overlapping wink photocell apertures 44 only permit passage of scene radiation which is spectrally filtered by the lower lens element 66 to reach the photodetector 38.

In the illustrated embodiment, the intensity, or, that is, the amplitude of the reflected infrared frequencies of the wink pulse is converted by a conversion and storage circuit 80 to a timed interval related to both the reflected wink amplitude and the aperture scanning rate so that the main flash will be fired at an aperture value selected in accordance with the measured amplitude which provides the weighted range value. It should also be understood, that while a conversion to a time function is used herein for dynamic aperture control of the resulting strobe exposure, the measured amplitude may be directly used to select a fixed aperture, or control the strobe output. In addition, as subsequently more fully explained, the reflected amplitude value or the magnitude of the timed interval derived therefrom is also compared to one or more predetermined levels to provide lens focusing.

In the illustrated embodiment, a conversion and storage circuit 80 receives the photocell output for a specified reception time following camera actuation, (for example, in synchronism with the wink pulse) evaluates the maximum photocell response during this specified time and produces a stored time interval responsive to the maximum. A variety of conventional circuits, such as analog or digital circuits or combinations thereof, may be utilized for such functions. For example, the maximum amplitude during the wink may be capacitively stored as a voltage or digitally provided as a pulse count in a counter (not shown) with the decay rate of the capacitor or read out rate of the counter being related to the aperture scan rate. The conversion and storage circuit 80 may include a capacitor (not shown) having a current bled continuously therethrough, and means for producing a voltage due to the resistive charge in the photocell and impressing such voltage across the capacitor, which will then be effective to generate a timing signal proportional to the reflected intensity of the infrared in the wink pulse. To simplify the timing control over the main flash, the stored time interval triggered to start timing or read out the data in the conversion and storage circuit 80 when the scanning shutter provides initially coincidence of some portion of the taking apertures over the exposure path.

A first light detect 84 is preferably employed to provide such read out signal and may be realized from the photocell lens assembly again registering light or from a control element (not shown) mounted on the shutter blades.

The timed interval is fed to a flash fire timer 78 which is configured to produce a flash trigger signal at the end of the interval and thereby fire a main flash in synchronism with an aperture selected in accordance with the reflected wink amplitude. A smaller aperture is selected for close distances than for large and, since the illustrated shutter provides progressively enlarging aperture values during its opening phase, the timed interval for flash fire is made inversely proportional to the reflected amplitude which is greater for close subjects.

Preferably, the main flash normally occurs within a sufficiently short time, for example, within 40 milliseconds following the wink flash so that the person being photographed effectively is aware of only one pulse of illumination. Although the main flash is timed to fire in accordance with wink amplitude, the maximum value for the time signal can be preselected to achieve the foregoing. For example, the maximum time delay between these flashes can be 40 milliseconds. The above value is for illustrative purposes only, and it should not in any way be considered a limitation.

As previously indicated, the weighted range signal is also employed for focusing. That is, while the reflected intensity is a function of both subject range and reflectivity, the latter is sufficiently muted by the use of infrared frequencies that the amplitude measurement is an adequate determination of range for at least rough focusing. For example, such signal will adequately define which of several focal zones the camera lens should be placed.

In the illustrated embodiment, two zones are described by way of example, although something in the order of four zones is quite useful. For focusing, a comparator 82, evaluates the reflected amplitude versus a given level to determine whether the amplitude is greater or less than a predetermined amount and in accordance with such determination shifts the lens to the proper zone by means of any conventional lens drive arrangement. For example, the comparator 82 compares the stored voltage of the conversion and storage circuit 80 with a preset voltage. If the stored voltage which is directly proportional to the reflected intensity is high, or, that is, exceeds the preset voltage, the subject is close and a signal is directed to the lens assembly to move the lens to its "near" zone. Conversely, if the amplitude is low, the lens will be moved to its far zone. As noted, the lens arrangement 22 is a dual zone focusing system normally positioned in its "far" zone. Thus, if the object 17 is in the far zone (e.g., more than 6 feet from the camera 10), the lens arrangement 22 will remain stationary. Should the object 17 be in a near zone (e.g., less than 6 feet from the camera 10), the lens arrangement 22 is driven to the second zone for proper focusing of the object 17, and after exposure will be reset or returned to the first zone as is more fully described in the last noted patent. In this embodiment, the focusing occurs as soon as the conversion circuit 80 achieves its completed range value triggering signal thereto. The signal for actuating the flash timer 78 is stored in the range storage device 84 for a time appropriate to allow the lens focusing function to be accomplished as well as to at least allow firing the main strobe after first light detect.

To complete the description of camera operation, it should be noted that during scanning of the shutter blades 26, 28 the scene light integrating circuit 40, which is coupled to the photodetector 38 of the photocell 37, is made operative by the time delay circuit 74 prior to first light for allowing exposure termination as a function of the time integration of scene light intensity reaching the photodetector 38. The scene light integrating circuit 40 upon reaching a predetermined value, taking into account both ambient and the reflected light of the main flash, will energize the shutter solenoid 56 in known fashion. Accordingly, the blades 26, 28 will be drawn back to their secure scene light blocking condition as depicted in FIG. 1. This ends the exposure cycle of the camera.

The foregoing camera arrangement of FIG. 2 may be modified as shown in FIG. 5 to utilize the wink ranging arrangement as shown in FIG. 5 in conjunction with a quench timer unit 86. In this arrangement, the quench timer unit 86 develops a quench interval or time which, in accordance with the weighted range signal developed through a conversion and storage circuit 88, determines the duration of the strobe illumination developed by the flash unit 90. The flash unit 90 is to be fired at a fixed time controlled by a flash fire unit 92 at any appropriate aperture defined by the shutter mechanism. Thus, the total amount of flash is controlled by the weighted range signal. Hence, the conversion and storage unit 88 and the quench timer unit 86 provide means for controlling the operation of the flash unit 90 during its second actuation for providing a predetermined contribution of the artificial illumination to the exposure.

In the illustrated embodiment, the weighted range signal is utilized for both automatic focusing and for synchronizing the main pulse of artificial illumination with a preselected aperture area. However, it will be appreciated that the spirit and scope of the present invention embodies use of such a range signal for controlling one or more photographic operations or functions and for achieving control of any particular operation in a variety of ways. For example, with regard to control of the flash contribution to the exposure, the weighted range signal may be utilized for presetting the aperture area to a predetermined value before firing of the main pulse. Similarly, such a ranging signal can be used for controlling the actual duration of the second or main pulse, as by quenching, or for modifying the amplitude of the second or main pulse in accordance with such range signal as well as other photographic functions. Further, although the foregoing description of flash control centers upon inclusion of the ranging apparatus and the control elements primarily in the camera, either or both can be operatively associated with the flash unit, per se, for controlling some of the noted photographic functions.

In this arrangement, only evaluation of the reflected infrared frequencies is preferred and substantial exclusion of visible frequencies is desired. However, it should be realized that any reduction in visible light reception from the scene versus infrared reception of the reflected wink light will provide an improvement in the range information from such a wink system. Consequently, the spectral filter 66 provides means for reducing the contribution to the wink evaluation of the visible scene light relative to that of the reflected infrared scene light during the flash wink. Although use of spectral filters has been described in passing infrared frequencies for evaluating purposes, it should be realized that the photodetector can be made so that it is responsive to the noted infrared frequencies.

In the illustrated embodiment the flash pulse, whose contribution to the exposure has been predetermined by the range factor and timed aperture fire, is seen by the photocell during exposure evaluation. To eliminate this pulse contribution to the evaluation, a sample and hold circuit such as described in the commonly assigned U.S. Pat. No. 4,192,587 may be employed to block integration of the flash pulse.

The flash wink system described above may be directly applied to the novel camera described and claimed in the last-noted U.S. Patent in which the strobe firing time is varied in accordance with a sonar range signal to synchronize flash firing with one of the varying aperture values during the shutter scan and the strobe output is varied between two states, a low or high level, in accordance with the state of the ambient light, or that is, when the ambient light is high or low respectively. Thus, the wink range signal and its wink derived flash fire time, can be substituted for the sonar derived flash fire time noted above.

In the last-noted patent, an additional aperture, (a pre-exposure aperture) is opened over the photocell when the blade mechanism is initially pulled in, just prior to release for exposure. Thus, in applying the present wink system to the camera of the last-noted patent, upon camera actuation the wink may be first actuated as previously explained, and the reflected amplitude then measured by the evaluator system through the wink aperture, and, in turn, converted to a flash fire time and stored. Then, the shutter would automatically pull-in and the evaluator system reset to now read the ambient light level.

The latter pre-exposure value is being directly used to set either a low or high strobe output in accordance with high or low ambient levels as explained in detail in the prior patent. Once the pre-exposure is complete, the integrator is automatically reset and the shutter released for exposure. During exposure, the first light is sensed, the flash fire time read from storage and flash, either a high or low value, fired at the range selected aperture value. For the exposure integration, a sample and hold arrangement may be used to eliminate the flash pulse from the exposure evaluation. As in the illustrated embodiment, the wink is evaluated through a visible block filter while other evaluations are preferably made through an infrared filter. The solenoid pull-in signal can be used to reset the light evaluator system for pre-exposure evaluation of ambient, while the subsequent solenoid release signal is used to reset it for first light detect and exposure integration.

Since in the just described embodiment the wink aperture is formed both before pull-in, when the blade mechanism is at rest, and again during release of the shutter, the wink could also, of course, be provided at the latter time. Similarly, the wink and pre-exposure aperture could be interchanged such that the wink is fired at pull-in rather than just before this operation.

In the illustrated embodiment, the novel wink arrangement is described in conjunction with a shutter control which substantially excludes all visible light from evaluation during the flash portion of the exposure. However, this wink arrangement is also directly applicable to a shutter control wherein a visible block filter is employed but only a portion of the visible light is excluded during the main flash as set forth in U.S. patent application Ser. No. 193,892 abandoned.

It is believed that the foregoing description fully describes the structure and operation of this embodiment. Since certain changes may be made in the above-described apparatus without departing from the scope of the invention herein involved, it is intended that all matter contained in the description or shown in the accompanying drawings shall be interpreted as illustrative and not in a limiting sense.

What is claimed is:

1. A camera comprising:
    a lens assembly for directing image-carrying light rays along a given path from a photographic scene to a focal plane;
    a shutter system for controlling the transmission of light from the scene to the focal plane so as to define an exposure interval during an evaluation period;
    means for first actuating a light source, configured to produce radiation which essentially comprises simultaneously of both visible and non-visible electromagnetic frequencies, to direct a first pulse of said radiation of given intensity toward a subject in the scene prior to commencement of or in the early stages of said exposure interval to evaluate the subject including its distance from the camera, and for subsequently actuating the same source to direct a second pulse of said radiation toward the scene during said exposure interval to artificially illuminate the subject of photographic recording during exposure;
    means for evaluating the intensity of light from the scene during the first pulse of illumination, said evaluating means including means for reducing the contribution to said evaluation of the visible frequencies relative to that of the non-visible frequencies from said scene responsive to said first pulse; and
    means responsive to the evaluated intensity of the scene including the reflection of the first pulse for controlling at least one photograhic function, whereby non-visible frequencies from the source are utilized for subject evaluation and subsequent photographic control, and the visible frequencies from the same source are utilized for scene illumination for photographic recording during the exposure interval.

2. The camera of claim 1 wherein said means for controlling at least one photographic function includes means for controlling said camera during the second actuation thereof to provide a predetermined contribution of the illumination to the exposure.

3. A camera comprising:
    a lens assembly for directing image-carrying light rays along a given path from a photographic scene to a focal plane;
    a shutter system for controlling the transmission of light from the scene to the focal plane so as to define an exposure interval during an evaluation period;
    means for first actuating a light source, configured to produce radiation which essentially comprises simultaneously of both visible and non-visible electromagnetic frequencies, to direct a first pulse of said radiation of given intensity toward a subject in the scene prior to commencement of or in the early stages of said exposure interval to evaluate the subject including its distance from the camera, and for subsequently actuating the same source to direct a second pulse of said radiation toward the scene during said exposure interval to artificially illuminate the subject for photographic recording during exposure;
    means for evaluating the intensity of primarily non-visible light from the scene during the first pulse of illumination; and
    means responsive to the evaluated intensity of the scene resulting from reflection of the first pulse for controlling at least one photographic function, whereby non-visible frequencies from the source are utilized for subject evaluation and subsequent photographic control, and the visible frequencies from the same source are utilized for scene illumination for photographic recording during the exposure interval.

4. The camera of claim 3 wherein said means for evaluating the reflected intensity from the first pulse comprises means for the evaluation of essentially infrared frequencies.

5. The camera of claim 3 wherein said means for controlling at least one photographic function includes means for controlling the operation of the source during the second actuation thereof to provide a predetermined contribution of the artifical illumination to the exposure.

6. The camera of claim 3 wherein said shutter system includes blade means operative for providing selected aperture values, and said means for controlling at least one photographic function includes means for coordinating operation of said blade means with the second actuation of the source to provide a predetermined aperture value during the second pulse in accordance with said evaluated intensity of said first pulse.

7. The camera of claim 3 wherein said means for controlling at least one photographic function includes means for controlling said camera during the second actuation thereof to provide a predetermined contribution of the illumination to the exposure.

8. The camera of claim 3 wherein said actuating means produces the first and second pulses of radiation such that regardless of subject range the second pulse is fired so that it is generally visually indistinguishable from the first pulse.

9. A camera system comprising:
a lens assembly for directing image-carrying light rays along a given path from a photographic scene to a focal plane;
a shutter system for controlling the transmission of light from the scene to the focal plane so as to define an exposure interval during an evaluation period;
an actuatable light source operative to produce radiation which essentially comprises simulataneously of both artificial visible and non-visible electromagnetic radiation frequencies;
means for first actuating said light source to direct a first pulse of said radiation of given intensity toward a subject in the scene prior to commencement of or in the early stages of said exposure interval to evaluate the subject including its distance from the camera system, and to subsequently actuate said light source to direct a second pulse of said radiation toward the scene during said exposure interval to illuminate the subject for photographic recording during exposure;
means for evaluating the intensity of primarily non-visible frequencies of the scene during said first pulse of radiation; and
means responsive to the evaluated intensity resulting from the scene including said first pulse for controlling at least one camera function of said system, whereby said non-visible frequencies from said source is utilized for subject evaluation and subsequent camera system control, and said visible light from the same source is utilized for scene illumination for photographic recording during the exposure interval.

10. The camera system of claim 9 wherein said means for evaluating the reflected intensity from said first pulse comprises means for the evaluation of infrared frequencies.

11. The camera system of claim 9 wherein said means for controlling said system includes means for controlling said camera system during the second actuation of said source to provide a predetermined contribution of the artificial illumination to the exposure.

12. The camera system of claim 11 wherein said means for controlling at least one camera system function includes means for controlling said light source during the second actuation thereof to provide a predetermined contribution of the artificial illumination to the photographic recording during the exposure interval.

13. Photographic apparatus comprising:
an actuatable light source operative to produce pulses of radiation which essentially comprises simultaneously of both visible and non-visible electromagnetic frequencies;
a shutter system for controlling the transmission of scene light to the focal plane so as to define an exposure interval during an evaluation period;
means responsive to a first signal for actuating said light source to direct a first pulse of said radiation thereof of given intensity toward a subject in a photographic scene prior to commencement of or in the early stages of an exposure interval to evaluate the subject including its distance from the light source and being responsive to a second signal for subsequently actuating said light source to direct a second pulse of frequencies of said radiation toward the scene during an exposure interval to illuminate the subject for photographic recording;
means for evaluating the intensity of primarily non-visible light reflected from the scene during said first pulse; and
means responsive to evaluated intensity resulting from reflection of said first pulse for controlling said light source during the second actuation thereof to provide a selected illumination of the subject during the exposure interval, whereby non-visible frequencies from said source are utilized for subject evaluation and control of the visible light from the same source subsequently utilized for scene illumination for photographic exposure during the exposure interval.

14. The camera of claim 13 wherein said means for evaluating the reflected intensity from said first pulse comprises means for the evaluation of essentially infrared frequencies.

15. A method of determining the object range for providing a photographic exposure at least in part with artificial illumination and with photographic apparatus having means for controlling the transmission of light along an exposure path for defining an exposure interval during an exposure period, ranging means including a source of artificial light actuatable for illuminating the scene essentially simultaneously with both visible and non-visible electromagnetic radiation, means for evaluating the radiation from a photographic scene, and means for actuating said source, the method comprising the steps of:
actuating said source to direct a first pulse of said electromagnetic radiation at a subject in the photographic scene;
evaluating radiation from the scene with the contribution to the evaluation of the visible frequencies being reduced relative to that of the non-visible frequencies radiating from said scene during said first pulse; and
controlling at least one photographic function operative in correspondence with the elevated radiation.

16. The method of claim 15 wherein said step of controlling at least one photographic function comprises the step of controlling the contribution of the source illumination of the source to the exposure during the exposure interval in correspondence with said evaluated amplitude.

17. A method of determining the object range for providing a photographic exposure at least in part with artificial illumination and with photograhic apparatus having means for controlling the transmission of light along an exposure path for defining an exposure interval during an exposure period, ranging means including a source of artificial light actuatable for illuminating the scene essentially simultaneously with both visible and non-visible electromagnetic radiation, means for evaluating the radiation from a photographic scene, and means for actuating said source, the method comprising the steps of:

actuating said source to direct a first pulse of said electromagnetic radiation at a subject in the photographic scene;

evaluating primarily non-visible radiation reflected from the scene by said first pulse; and controlling at least one photograhic function in correspondence with the evaluated non-visible radiation.

18. A method of determining the object range for providing a photographic exposure at least in part with artificial illumination and with photograhic apparatus having means for controlling the transmission of light along an exposure path for defining an exposure interval during an exposure period, ranging means including a source of artificial light actuatable for illuminating the scene essentially simultaneously with both visible and non-visible electromagnetic radiation, means for evaluating the amplitude of the radiation from a photographic scene, and means for actuating said source, the method comprising the steps of:

actuating said source to direct a first pulse of said electromagnetic radiation at a subject in the photographic scene;

evaluating the amplitude of essentially only non-visible radiation reflected from the scene by said first pulse;

controlling at least one photographic function operative during the exposure period in correspondence with the evaluated amplitude of said non-visible radiation;

initiating the exposure interval; and again actuating said source to produce a second pulse of said electromagnetic radiation to illuminate the subject during the exposure period.

19. The method of claim 18 wherein said step of evaluating essentially only non-visible radiation comprises the step of evaluating infrared frequencies.

20. The method of claim 18 wherein said step of controlling at least one photographic function comprises the step of controlling the contribution of the source illumination of the source to the exposure during the exposure interval in correspondence with said evaluated amplitude.

21. The method of claim 18 wherein the time between the steps of first and second actuations of said source is sufficiently short such that the pulses are visually indistinguishable from each other as separate pulses.

22. The method of claim 18 further comprising the step of also evaluating non-visible radiation during said second pulse.

23. A camera comprising:

a lens assembly for directing image-carrying light rays along a given path from a photographic scene to a focal plane;

a shutter system for controlling the transmission of light from the scene to the focal plane so as to define an exposure interval during an evaluation period;

means for first actuating a light source, configured to produce both visible and non-visible electromagnetic frequencies, to direct a first pulse of radiation of given intensity toward a subject in the scene prior to commencement of or in the early stages of said exposure interval to evaluate the subject including its distance from the camera, and for subsequently actuating the same source to direct a second pulse of radiation toward the scene during said exposure interval to artificially illuminate the subject for photographic recording during exposure;

means for evaluating the intensity of light from the scene during the first pulse of illumination, said evaluating means including means for reducing the contribution to said evaluation of the visible frequencies relative to that of the non-visible frequencies from said scene responsive to said first pulse;

means responsive to the evaluated intensity of the scene including the reflection of the first pulse for controlling at least one photographic function, whereby non-visible frequencies from the source are utilized for subject evaluation and subsequent photographic control, and the visible frequencies from the same source are utilized for scene illumination for photographic recording during the exposure interval; and said evaluating means includes a photocell sensitive to both visible and non-visible frequencies and means for reducing transmission of visible frequencies to said photocell during the first pulse for determining said scene information and for permitting transmission of visible radiation to said photocell at another time to evaluate scene lighting for the photographic recording during exposure.

24. A camera comprising:

a lens assembly for directing image-carrying light rays along a given path from a photographic scene to a focal plane;

a shutter system for controlling the transmission of light from the scene to the focal plane so as to define an exposure interval during an evaluation period;

means for first actuating a light source, configured to produce both visible and non-visible electromagnetic frequencies, to direct a first pulse of radiation of given intensity toward a subject in the scene prior to commencement of or in the early stages of said exposure interval to evaluate the subject including its distance from the camera, and for subsequently actuating the same source to direct a second pulse of radiation toward the scene during said exposure interval to artificially illuminate the subject for photographic recording during exposure;

means for evaluating the intensity of primarily non-visible light from the scene during the first pulse of illumination;

means responsive to the evaluated intensity of the scene resulting from reflection of the first pulse for controlling at least one photographic function, whereby non-visible frequencies from the source are utilized for subject evaluation and subsequent photographic control, and the visible frequencies from the same source are utilized for scene illumination for photographic recording during the exposure interval; and said evaluating means includes a photocell sensitive to both visible and non-visible frequencies and means for reducing transmission of visible frequencies to said photocell during the first pulse for determining said scene information and for permitting transmission of visible radiation to said photocell at another time to evaluate scene lighting for the photographic recording during exposure.

25. A camera comprising:

a lens assembly for directing image-carrying light rays along a given path from a photographic scene to a focal plane;

a shutter system for controlling the transmission of light from the scene to the focal plane so as to define an exposure interval during an evaluation period;

means for first actuating a light source, configured to produce both visible and non-visible electromagnetic frequencies, to direct a first pulse of radiation of given intensity toward a subject in the scene prior to commencement of or in the early stages of said exposure interval to evaluate the subject including its distance from the camera, and for subsequently actuating the same source to direct a second pulse of radiation toward the scene during said exposure interval to artificially illuminate the subject for photographic recording during exposure;

means for evaluating the intensity of primarily non-visible light from the scene during the first pulse of illumination;

means responsive to the evaluated intensity of the scene resulting from reflection of the first pulse for controlling at least one photographic function, whereby non-visible frequencies from the source are utilized for subject evaluation and subsequent photographic control, and the visible frequencies from the same source are utilized for scene illumination for photograhic recording during the exposure interval; and said lens assembly is a variable objective lens assembly, and wherein said means for controlling at least one photographic function includes means for varying said variable objective lens assembly to provide a focal position thereof in accordance with said evaluated intensity of the first pulse.

26. A camera system comprising:

a lens assembly for directing image-carrying light rays along a given path from a photographic scene to a focal plane;

a shutter system for controlling the transmission of light from the scene to the focal plane so as to define an exposure interval during an evaluation period;

an actuatable light source operative to produce both artificial visible and non-visible electromagnetic radiation frequencies;

means for first actuating said light source to direct a first pulse of radiation of given intensity toward a subject in the scene prior to commencement of or in the early stages of said exposure interval to evaluate the subject including its distance from the camera system, and to subsequently actuate said light source to direct a second pulse of radiation toward the scene during said exposure interval to illuminate the subject for photographic recording during exposure;

means for evaluating the intensity of primarily non-visible frequencies of the scene during said first pulse of radiation;

means responsive to the evaluated intensity resulting from the scene including said first pulse for controlling at least one camera function of said system, whereby said non-visible frequencies from said source is utilized for subject evaluation and subsequent camera system control, and said visible light from the same source is utilized for scene illumination for photographic recording during the exposure interval; and said evaluating means includes a photocell sensitive to both visible and non-visible frequencies and means for blocking transmission of visible frequencies to said photocell during the first pulse for determining said scene information and for permitting transmission of visible radiation to said photocell at another time to evaluate scene lighting for the photographic recording during exposure.

27. A camera system comprising:

a lens assembly for directing image-carrying light rays along a given path from a photographic scene to a focal plane;

a shutter system for controlling the transmission of light from the scene to the focal plane so as to define an exposure interval during an evaluation period;

an actuatable light source operative to produce both artificial visible and non-visible electromagetic radiation frequencies;

means for first actuating said light source to direct a first pulse of radiation of given intensity toward a subject in the scene prior to commencement of or in the early stages of said exposure interval to evaluate the subject including its distance from the camera system, and to subsequently actuate said light source to direct a second pulse of radiation toward the scene during said exposure interval to illuminate the subject for photographic recording during exposure;

means for evaluating the intensity of primarily non-visible frequencies of the scene during said first pulse of radiation;

means responsive to the evaluated intensity resulting from the scene including said first pulse for controlling at least one camera function of said system, whereby said non-visible frequencies from said source is utilized for subject evaluation and subsequent camera system control, and said visible light from the same source is utilized for scene illumination for photographic recording during the exposure interval; and said lens assembly includes a variable objective lens assembly, and wherein said means for controlling said camera system includes means for varying said variable objective lens assembly to provide a focal position thereof in accordance with said evaluated intensity of said first pulse.

28. A method of determining the object range for providing a photographic exposure at least in part with artificial illumination and with photographic apparatus having means for controlling the transmission of light along an exposure path for defining an exposure interval during an exposure period, ranging means including a source of artificial light actuatable for illuminating the scene with both visible and non-visible radiation, means for evaluating the radiation from a photographic scene, and means for actuating said source, the method comprising the steps of:

actuating said source to direct a first pulse of electromagnetic radiation at a subject in the photographic scene;

evaluating radiation from the scene with the contribution to the evaluation of the visible frequencies being reduced relative to that of the non-visible frequencies radiating from said scene during said first pulse;

controlling at least one photographic function operative in correspondence with the evaluated radiation; and said step of controlling at least one photographic function comprises varying the focal position of the camera lens in correspondence with said evaluated amplitude.

29. A method of determining the object range for providing a photographic exposure at least in part with artificial illumination and with photographic apparatus having means for controlling the transmission of light along an exposure path for defining an exposure interval during an exposure period, ranging means including a source of artificial light actuatable for illuminating the scene with both visible and non-visible radiation, means for evaluating the amplitude of the radiation from a photographic scene, and means for actuating said source, the method comprising the steps of:

actuating said source to direct a first pulse of electromagnetic radiation at a subject in the photographic scene;

evaluating the amplitude of essentially only non-visible radiation reflected from the scene by said first pulse;

controlling at least one photographic function operative during the exposure period in correspondence with the evaluated amplitude of said non-visible radiation;

initiating the exposure interval;

again actuating said source to produce a second pulse to illuminate the subject during the exposure period; and said step of controlling at least one photographic function comprises varying the focal position of the camera lens in correspondence with said evaluated amplitude.

* * * * *